A. J. BALDAUF.
DISPLAY DEVICE.
APPLICATION FILED MAR. 18, 1916.
1,191,144. Patented July 18, 1916.
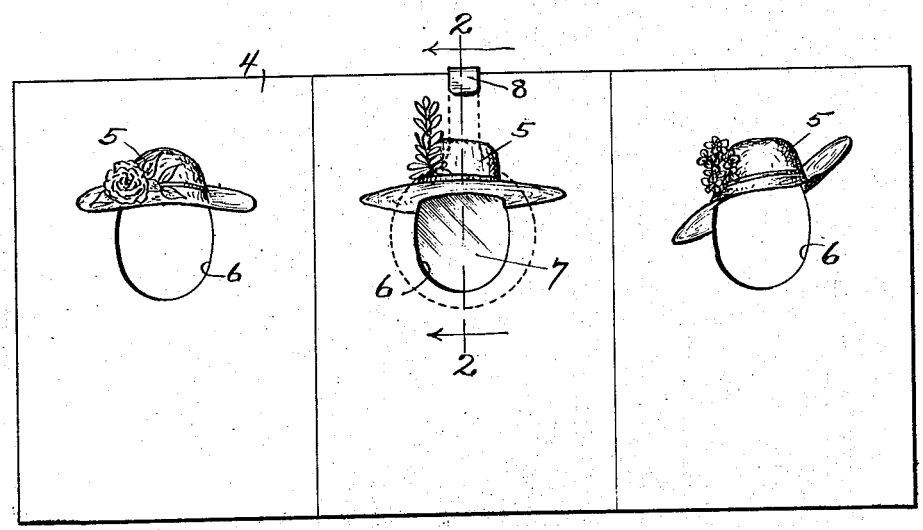
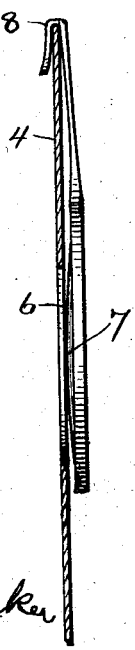
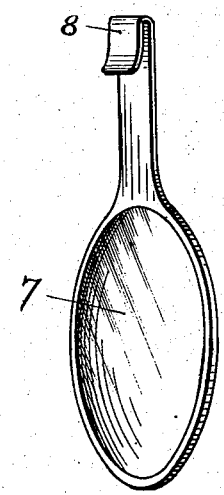

UNITED STATES PATENT OFFICE.

ARTHUR J. BALDAUF, OF CHICAGO, ILLINOIS.

DISPLAY DEVICE.

1,191,144.  Specification of Letters Patent.  Patented July 18, 1916.

Application filed March 18, 1916. Serial No. 85,095.

*To all whom it may concern:*

Be it known that I, ARTHUR J. BALDAUF, a citizen of the United States, residing in the city of Chicago, in the county of Cook and State of Illinois, have invented new and useful Improvements in Display Devices, of which the following is a specification.

My invention consists in the use of a sheet, card, circular or pages in a catalogue, printed, lithographed or reproduced by any of the usual methods, whereon is pictured the article to be worn on the person, such as hats, collars, cravats and ornaments, or whereon the body of the person is pictured using the article, such as being seated in, and operating, an automobile, but the person's face not being pictured, and either with an opening cut into the sheet or page in such a way that a mirror which is temporarily or permanently attached to the page or sheet immediately behind the opening will show how the article advertised looks in connection with the person of the one inspecting the same, his own face being shown in the mirror in connection with the article as usually used; or producing the same effect without having an opening cut into the page or sheet by fastening to the front of such page or sheet a mirror suitably proportioned. I attain these objects by the devices illustrated in the accompanying drawing, in which—

Figure 1 illustrates the article to be advertised with an opening appropriately made, behind which the mirror, Fig. 3, may be placed, as shown by the side view in Fig. 2 and the front view in the middle third of Fig. 1.

Fig. 1 shows the advertising sheet in which number 4 is the sheet of paper itself; number 5 the article to be advertised, which in the illustration is a lady's hat; and number 6 the opening cut into the sheet behind which is to be placed the mirror in which the prospective customer will see his own face reflected, demonstrating how the article advertised will appear as worn by the prospective buyer.

Fig. 3 is a view on the front and one side of the mirror and frame, of which number 7 is the reflecting part, and number 8 the device, whereby in this sort of a sheet, the mirror is hooked over the upper edge of the page; the hook being of the exact length necessary to bring the mirror "7" immediately back of the opening "6," as shown in the middle third of Fig. 1.

Fig. 2 is a side view of the mirror in place, front view shown in middle third, "Fig. 1," wherein the handle "8" is hooked over the top of the sheet, and reflecting part "7" is immediately back of the opening "6" in the sheet of paper "4."

I claim:—

1. A display device comprising a support having an opening therein, a representation of the article advertised on the support adjacent to the opening and a mirror suitably supported back of the opening.

2. The combination of a mirror affixed by a hook or other simple method behind an opening in a sheet, on which is pictured an article advertised to be sold, the opening and mirror being so placed with reference to said pictured article as to illustrate to the person examining it how he would appear using the article in question.

3. The combination of a mirror affixed by any simple or usual method to a card, sheet or page on which is pictured an article advertised to be sold, the mirror being so proportioned in size and so placed with reference to the said pictured article as to illustrate to the person examining it how he would appear using the article in question.

4. The combination of a mirror with a hook at one end of such exact length that the same can be hooked over the top of a sheet of paper and will then hang on the back of that sheet of paper with the mirror fronting forward, so as to cover an opening which has been made at a definite distance from the top of the sheet.

ARTHUR J. BALDAUF.

Witnesses:
 DON SPIEGEL,
 H. B. GREENBAUM.